Sept. 10, 1968 J. L. E. BALDWIN 3,401,231

MAGNETIC PLAYBACK HEAD SWITCHING APPARATUS

Filed July 29, 1965 4 Sheets-Sheet 1

INVENTOR
JOHN LEWIS EDWIN BALDWIN
BY Kane and Nydick
ATTORNEYS

INVENTOR
JOHN LEWIS EDWIN BALDWIN
BY Haseltine, Lake
ATTORNEY

MAGNETIC PLAYBACK HEAD SWITCHING APPARATUS

Filed July 29, 1965 4 Sheets-Sheet 3

INVENTOR
JOHN LENIS EDWIN BALDWIN
BY Hane and Nydick
ATTORNEYS

INVENTOR
JOHN LEWIS EDWIN BALDWIN
BY Hane and Nydick
ATTORNEYS

United States Patent Office 3,401,231
Patented Sept. 10, 1968

3,401,231

MAGNETIC PLAYBACK HEAD SWITCHING APPARATUS

John Lewis Edwin Baldwin, Croydon, England, assignor to Rank-Bush Murphy Limited Filed July 29, 1965, Ser. No. 475,686
Claims priority, application Great Britain, Aug. 4, 1964, 30,440/64
9 Claims. (Cl. 178—6.6)

Figure 1:
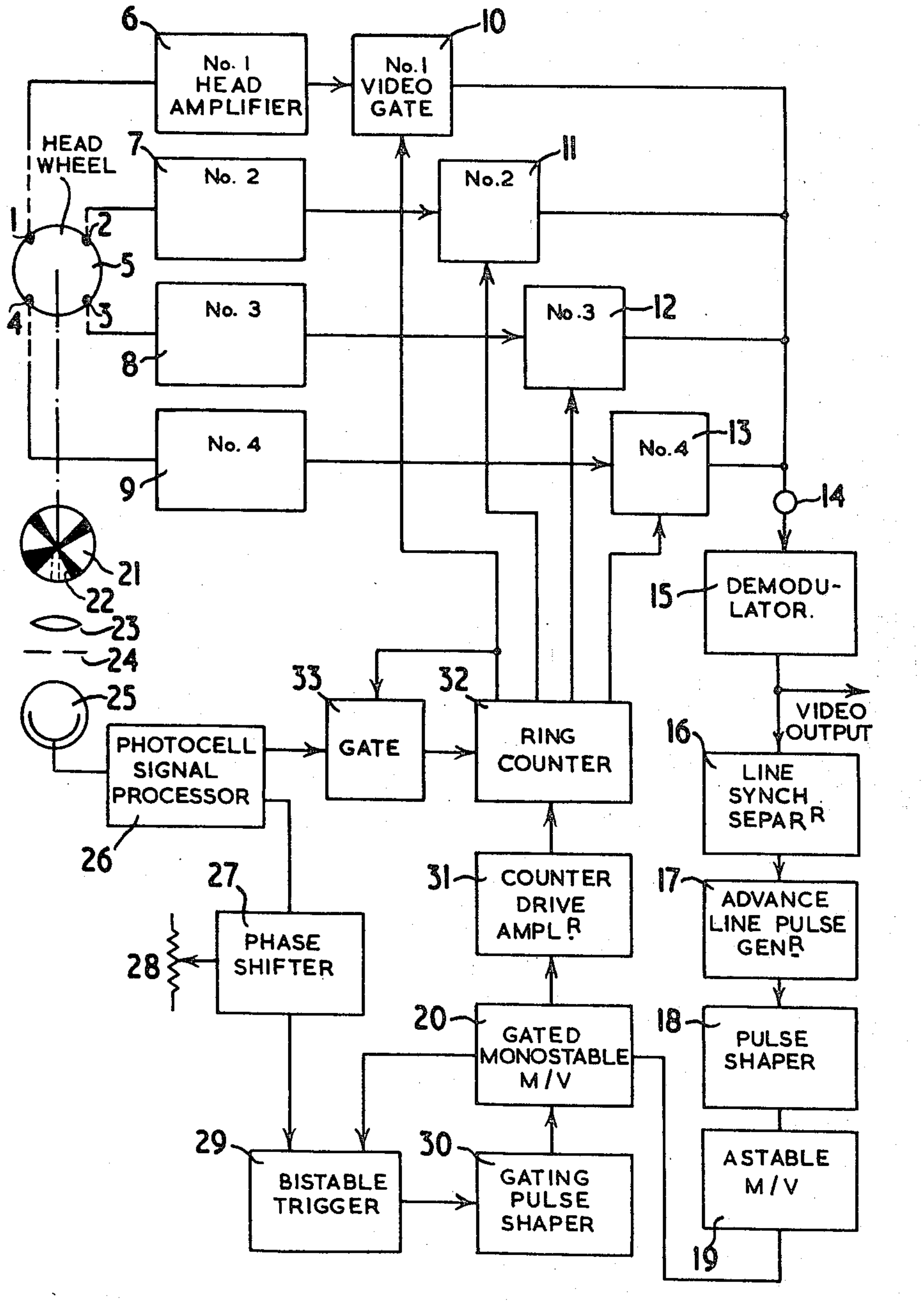

This invention relates to magnetic record playback apparatus arrangements and in particular to circuit arrangements in such appartus suitable for controlling switching from one to another of a plurality of transducer heads operative in succession to reproduce signals from magnetic tape or other record media.

The invention will be described with particular reference to its employment in apparatus using four successively-operative transducer heads for reproducing video signals from magnetic tape, but it will be apparent that its application is not limited to this specific type of apparatus but that it could find application also where two or more successively operative transducer heads are employed to reproduce signals from record media of other kinds.

It is an object of the present invention to provide magnetic record playback apparatus using cyclically operating switching means for switching transducer heads to an output terminal in proper sequence.

It is a further object of the present invention to provide magnetic record playback apparatus including simple means for producing proper phasing with respect to the transducer head sequence of the switching sequence of cyclically operating switching means used to connect transducer heads to an output terminal.

It is another object of the present invention to provide magnetic record playback apparatus employing cyclic transducer head switching means which includes advantageous means for producing switching from one transducer head to another at a desired instant in a signal reproduced by the transducer heads.

Still another object of the present invention is to provide magnetic record playback apparatus including simple means for developing transducer head switching sequence control signals from a single patterned member rotating with means carrying transducer heads engaging a record member.

Figure 2:
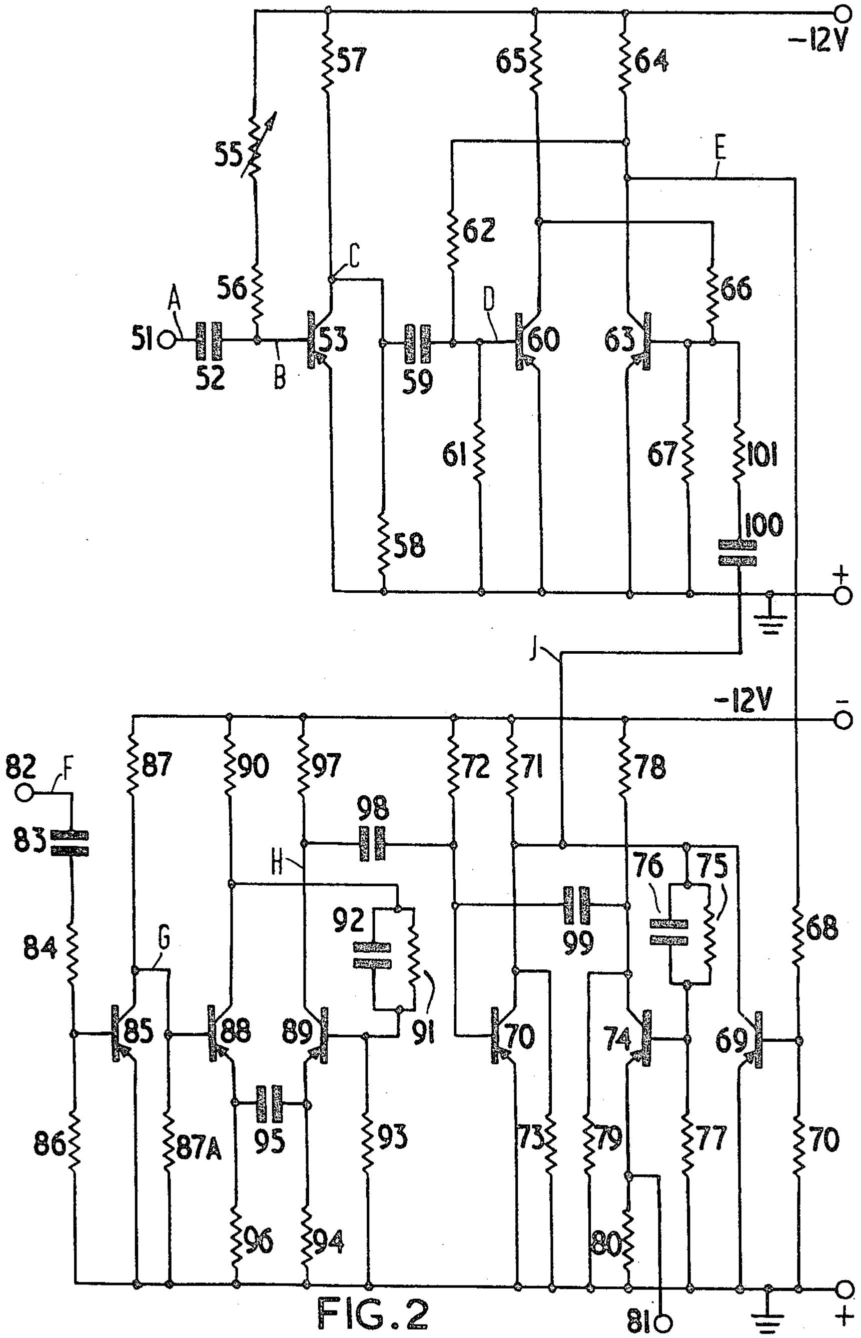
Figure 3:
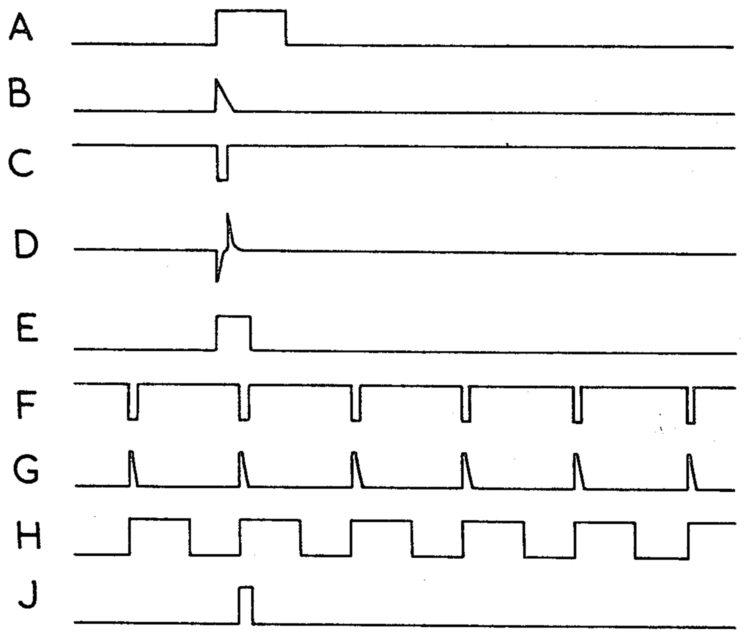
Figure 4:
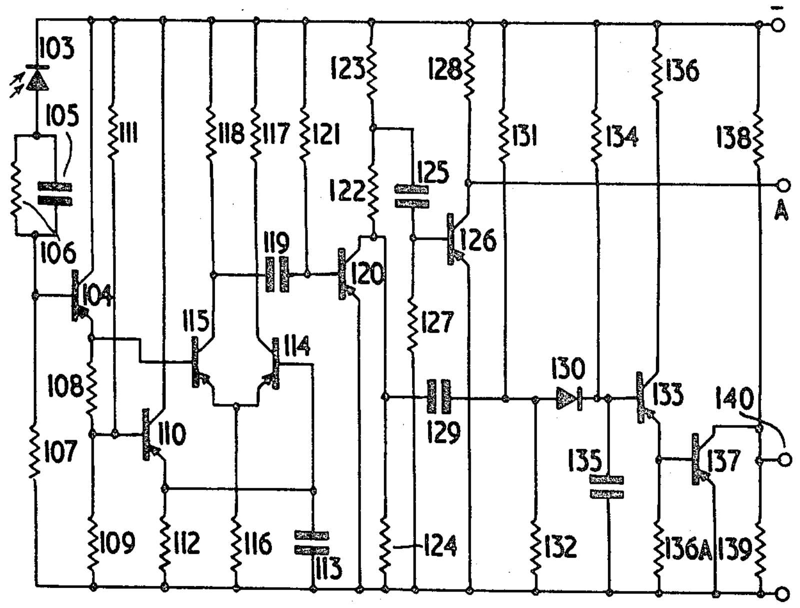
Figure 5:
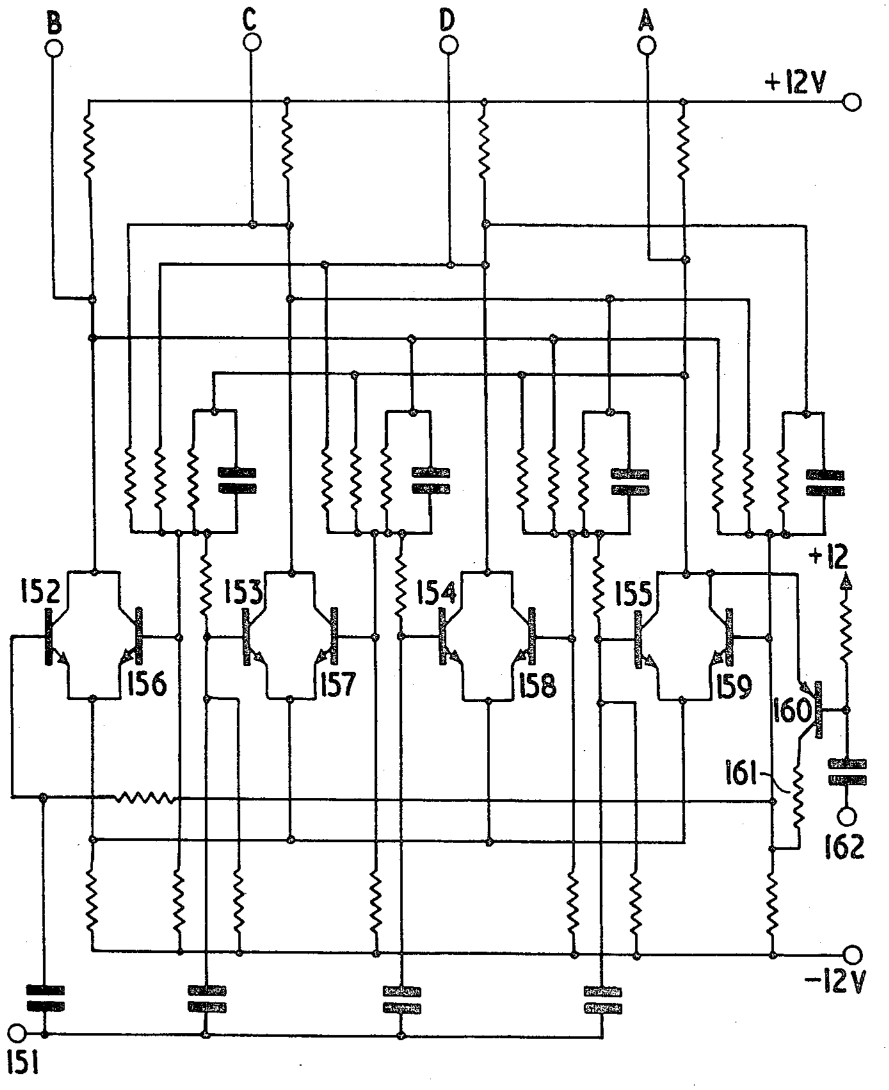

The features of the invention which are believed to be novel are recited with particularity in the appended claims. The invention, together with further features and advantages thereof, is best understood from the following description taken in conjunction with the accompanying drawings, in the several figures of which like elements are denoted by like reference numerals and in which:

FIGURE 1 is a block diagram representing a magnetic tape video signal reproducing equipment making use of the present invention, FIGURE 2 is a circuit diagram of apparatus capable of performing the functions of some of the units described in relation to FIGURE 1, FIGURE 3 comprises a series of waveform diagrams illustrating the operation of the circuit described in relation to FIGURE 2, FIGURE 4 shows the circuit diagram of apparatus suitable to perform the functions of an element of one unit of FIGURE 2, and FIGURE 5 shows the circuit diagram of apparatus suitable to perform the functions of an element of another unit of FIGURE 2.

In the embodiment of apparatus according to the invention for controlling the switching of transducer heads in a magnetic tape video recorder which is illustrated in FIGURE 1 four transducer heads 1, 2, 3, 4 are carried on the periphery of a head-wheel 5. The signals from heads 1 to 4 are applied to individual head amplifiers 6, 7, 8 and 9 respectively which provide necessary signal gain and equalisation. The outputs from the head amplifiers are applied to corresponding gate circuits 10, 11, 12, 13 which when operative allow the signals applied to them to pass through to a common output terminal 14.

Signals thus applied to terminal 14 are fed to a demodulator 15 which recovers a video signal from the frequency-modulated signal conventionally recorded upon the tape. This video signal is taken for use as required and is also applied to a line synchronising signal separator 16, which as implied separates from the video signal the synchronising impulses repetitive at the line frequency. The circuit arrangements employed for the demodulator and synchronising separator may be conventional. The separated line synchronising signals are applied to control an advance line pulse generator 17 of a kind known in the art. This circuit develops an impulse which occurs shortly before the line synchronising impulses. The advance pulses thus developed are applied to a pulse shaper 18, whence the shaped pulses are applied to an astable multivibrator circuit 19. Pulses developed by multivibrator 19 are applied to assist in controlling a gated multivibrator 20.

Upon the shaft of scanning member or head-wheel 5 is disposed a disc 21 carrying a pattern of differentially reflective areas. This pattern is such that some edges form a symmetrical pattern having a repetition rate equal to that of the transducer heads, while the remaining edges exhibit an asymmetry repetitive at the rate of rotation of the head wheel.

Light from a suitable source (not shown) is reflected by disc 21 on to a photodiode 23.

Signals developed by photodiode 23 are applied to a signal processor circuit 26, conveniently of the kind described in co-pending patent application 25,579/61 above referred to. This circuitry is such as to derive two sets of impulses, one recurrent at the repetition rate of transducer heads 1–4 and the other recurrent at the rate of rotation of head-wheel 5.

That train of pulses from photocell signal processor 26 which is recurrent at the head repetition rate is applied to an adjustable delay circuit 27, yielding output pulses of which the phase may be shifted in relation to the input pulses under the control of an adjustable resistor 28. The output pulses from phase shifter 27 are applied to a bistable trigger circuit 29, which is thus set into a condition in which it supplies a signal to a gating pulse shaper circuit 30. The gating pulse thus shaped by circuit 30 is applied to gated multivibrator 20 already referred to. When a gating pulse from shaper 30 and a pulse from multivibrator 19 are both applied to multivibrator 20, this circuit will perform a cycle of operation, yielding an output pulse to counter drive amplifier 31. Multivibrator 20 also yields an output signal which is applied to reset bi-stable trigger 29 to its initial condition.

The amplified drive pulse from drive amplifier 31 is applied to a suitable ring counter 32. Whatever its construction, counter 32 should be such that it provides at a plurality of output terminals equal to the number of gate circuits a sequence of signals without overlap or underlap, causing the gate circuits to open in succession for the passage of signals.

The arrangement so far described ensures that the switching from each head to the next occurs in the appropriate sequence and that each switching action occurs somewhat before the occurrence of a line synchronising impulse in the television signal reproduced from the tape. To prevent incorrect operation resulting for example as a result of a drop-out, the first synchronising signal to occur after a head has engaged the tape should be absent from the demodulated signal, astable multivibrator 19 is provided. This multivibrator will, in the absence of a controlling impulse from pulse 18, itself provide a pulse to gated multivibrator 20 which will result in the production of a counter drive impulse. The timing of this impulse will be slightly incorrect, but it is thus ensured that a close approximation to the correct timing of switching operations is maintained.

To ensure that the head-switching is appropriately phased in relation to the rotation of the head-wheel, the train of impulses from photocell signal processor 26 which is repetitive at the rate of rotation of the head-wheel is applied to a gate circuit 33. Gate circuit 33 is controlled by the output from a selected stage of ring counter 32, so that if this selected stage is operative when the pulse from processor 26 is applied to gate 31 the gate remains closed and the pulse will have no effect. If on the other hand, the pulse from the processor is applied to the gate when some other stage of the counter is operative, then the reset pulse is allowed to pass to counter 30 to cause the correct stage to become operative. After this action the counter will remain in the correct phase until operation is interrupted.

FIGURE 2 of the drawings shows the circuit diagram of apparatus suitable for performing the functions required of units 18, 19, 20, 27, 29 and 30 of FIGURE 1. This apparatus will now be described with reference also to the waveform diagrams given in FIGURE 3. To input 51 of the apparatus shown in FIGURE 2 there are applied signals, represented by waveform A in FIGURE 3, which are repetitive at the same rate as the transducer heads. These signals are derived from the photoelectric pulse generator 21–25 of FIGURE 1 by way of signal processor 26. The signals take the form of positive-going pulses, and are applied by way of a capacitor 52 to the base of a transistor 53 which is thus cut off. After a time determined by the amplitude of the input signal the value of capacitor 52 and the current flowing through the resistance through which the base of the transistor is returned to the —12 v. negative supply line connected to supply terminal 54 the transistor will again become conductive. This resistance is formed by the series combination of a variable resistor 55 and a fixed resistor 56. Variation of the value of resistor 55 alters the time constant and thus controls the period for which transistor 53, which is normally bottomed since its base is returned to the negative line, remains cut off after the receipt of a positive-going impulse at terminal 51. The voltage waveform appearing at the base of transistor 53 is shown in FIGURE 3B.

Each pulse received at terminal 51 thus causes transistor 53 to be cut off for an adjustable period. The collector of transistor 53 is returned to the negative line by way of a resistor 57 and to the positive line through an equal resistor 58, so that when the transistor is cut off the potential at its collector is —6 v. Thus input pulses give rise to negative-going pulses of —6 v. amplitude and of a duration which may be adjusted from some 10 $\mu$s. to some 60 $\mu$s. The adjustment thus available is useful in compensating for minor mechanical inaccuracies in the photoelectric pulse generator.

The negative going pulses, shown in waveform 3C which thus appear at the collector of transistor 53 are applied by way of a capacitor 59 to the base of a transistor 60 which has its emitter earthed and its base returned to earth by way of a resistor 61. The base of transistor 60 is also connected by way of a resistor 62 to the collector of a transistor 63 which with the transistor 60 forms a trigger pair. The collector of transistor 63 is returned to the negative line by way of a load resistor 64. The base of transistor 60 is initially negatively biased by the current fed to its base from the resistor chain 61, 62, 64, so that the transistor is initially bottomed. The applied pulses are differentiated by capacitor 59 and the resistance associated with the base of transistor 60 yielding the signal illustrated by waveform 3D. The negative-going differentiation spikes resulting from the leading edges of the drive pulses are thus ignored, since transistor 60 is already conductive, but the positive-going pulses resulting from the trailing edges cause transistor 60 to be cut off.

The collector of transistor 60 is returned to the negative line by way of a load resistor 65. The negative-going change in potential which therefore appears at the collector of transistor 60 when this is cut off is applied by way of a coupling resistor 66 to the base of transistor 63, which is thus turned on. The base of transistor 63 is connected to the positive line by way of a resistor 67 which ensures proper bias conditions. Transistor 63 is thus turned on so that there appears at its collector a positive-going change in potential illustrated by waveform 3E which persists until the condition of the trigger circuit is later reversed.

This positive-going change in potential is applied by way of a coupling resistor 68 to the base of a transistor 69, which is normally bottomed, since its base is fed with appropriate current by the resistor chain formed by resistors 64, 68 already mentioned and a resistor 70 by which it is returned to the positive line. In its normally conductive condition, transistor 69 holds substantially to earth potential the potential at the collector of a transistor 70. This collector is returned to the negative line by way of a resistor 71, while its base is also returned to the negative line by way of a resistor 72. Transistor 70 is therefore normally bottomed, while as has been stated the potential at its collector is also held to earth potential by transistor 69, until this is cut off.

The collector of transistor 78 is also returned to the positive line by way of a resistor 73 of equal value to the resistor 71 and is coupled to the base of a transistor 74 by way of the parallel combination of a resistor 75 and a capacitor 76. The base of transistor 74 is also returned to the positive line through a resistor 77, while is collector is returned to the negative line by way of a load resistor 78 and to the positive line through an equal resistor 79, the emitter of transistor 74 is taken to the positive line by way of a resistor 80 of low value and signals appearing at the emitter are made available for use at an output terminal 81.

To input terminal 82 are applied pulses provided by advance pulse generator 17 of FIGURE 1. These pulses which are illustrated in waveform 3F are timed to be approximately coincident with the commencement of the horizontal blanking interval and are of short duration, for example 0.5 $\mu$s. These pulses are applied by way of a capacitor 83 and a resistor 84 to the base of a transistor 85, this base being also returnned to the positive line by way of a resistor 86. The values of these input components are such thaat the pulse is differentiated, so that the negative-going leading edge of each pulse causes transistor 85 to conduct. The collector of transistor 85 is returned to the negative line by way of a resistor 86 and to the positive line by way of a resistor 87. The operating conditions of this transistor are such that the narrow pulse signal appearing at its collector is clipped both top and bottom. This positive-going signal illustrated by waveform 3G is applied to the base of a transistor 88, which with another transistor 89 forms an emitter-coupled multivibrator. In the absence of applied pulses, this multivibrator will perform a cycle of operation at a repetition rate of some 8 kc./s. To this end the collector of transistor 88 is returned to the negative line by way of a load resistor 90 and is coupled to the base of transistor 89 by way of the parallel combintion af a resistor 91 and a capacitor 92. The base of transistor 89 is returned to the positive line by way of a resistor 93 and its emitter is taken to the positive line by way of a resistor 94 and is coupled to the emitter of a transistor 88 by way of a capacitor 95. The emitter of transistor 88 is taken to the positive line by way of a resistor 96.

In normal operation, when the advance pulses are present, multivibrator 88, 89 develops an approximately square-wave signal, shown at waveform 3H, which appears across a collector load resistor 97 of transistor 89 and is fed by way of a capacitor 98 to the base of transistor 70. Positive-going edges in this square-wave signal are initiated by the advance pulses received at terminal 82.

Transistor 70 will be cut off by each positive-going signal applied to its base from capacitor 98, while at the first advance pulse to occur after circuit 60, 63 has changed state in response to a timing pulse received at input terminal 51 from signal processor 26 of FIGURE 1 transistor 69 will also be cut off. The potential at the collector of transistor 70 will therefore go negative and a cycle of operation of the monostable trigger 70, 74 will thus be initiated. Transistor 74 is made conductive by the negative signal applied to its base by way of coupling circuit 75, 76 and a negative-going counter drive output pulse will thus appear at its emitter and at output terminal 81. The duration of this pulse is determined by the time-constant formed by a coupling capacitor 99 connected between the collector of transistor 74 and the base of transistor 70 and the resistor 72 through which this base is returned to the negative line. When the positive charge injected into capacitor 99 has leaked away sufficiently for transistor 70 to conduct again a reverse trigger action occurs to terminate the output pulse. The positive-going change in potential arising at the collector of transistor 70, which is illustrated by waveform 3J, is also applied by way of a capacitor 100 and a resistor 101 to the base of transistor 63 in the bistable trigger circuit 60, 63, which is thus returned to its initial condition, leaving the whole circuit ready for another cycle of operation.

Suitable component values for a circuit arrangement of the kind described above in relation to FIGURES 2 and 3 are as follows:

Capacitors:

| | |
|---|---|
| 52 | μf 0.01 |
| 59 | pf 2200 |
| 76 | pf 1000 |
| 83 | pf 1000 |
| 95 | μf 0.33 |
| 99 | pf 4700 |
| 100 | pf 1000 |
| 92 | pf 1000 |

Transistors (all Mullard):

| | |
|---|---|
| 53 | GET 882 |
| 60 | GET 882 |
| 63 | GET 882 |
| 69 | GET 882 |
| 70 | GET 882 |
| 74 | GET 882 |
| 85 | ASZ 21 |
| 88 | GET 882 |
| 89 | GET 882 |

Resistors:

| | |
|---|---|
| 55 | 0–50KΩ |
| 56 | 10KΩ |
| 57 | 2.2KΩ |
| 58 | 2.2KΩ |
| 61 | 2.2KΩ |
| 62 | 4.7KΩ |
| 64 | 2.2KΩ |
| 65 | 2.2KΩ |
| 66 | 4.7KΩ |
| 67 | 2.2KΩ |
| 68 | 4.7KΩ |
| 70 | 2.2KΩ |
| 71 | 2.2KΩ |
| 72 | 2.2KΩ |
| 73 | 2.2KΩ |

Resistors:

| | |
|---|---|
| 75 | 4.7KΩ |
| 77 | 2.2KΩ |
| 78 | 2.2KΩ |
| 79 | 2.2KΩ |
| 80 | 100Ω |
| 84 | 180Ω |
| 86 | 1KΩ |
| 87 | 10KΩ |
| 87A | 3.3KΩ |
| 90 | 680Ω |
| 91 | 4.7KΩ |
| 93 | 3.3KΩ |
| 94 | 1KΩ |
| 96 | 470Ω |
| 97 | 470Ω |
| 101 | 1KΩ |

FIGURE 4 shows the circuit arrangement of apparatus suitabe for use as signal processor 26 of FIGURE 1. Light reflected from a narrow radial zone of illuminated disc 21 is caused to illuminate a photodiode 103 which is connected in a voltage divider determining the voltage applied to the base of transistor 104. Between the anode of diode 103, the cathode of which is connected to the negative line and the base of transistor 104 is connected a coupling circuit comprising a capacitor 105 shunted by a resistor 106, while the base of transistor 104 is returned to the positive line by way of resistor 107. Transistor 104 is an emitter-follower, the load of which consists of the series combination of two resistors 108, 109. The signal appearing at the junction of resistors 108, 109 is applied to the base of a transistor 110, the base bias potential being fixed at a desired value by a resistor 111 connected from the negative line to the base. The values of resistors 108, 109 are so chosen that transistor 110, of which the collector is taken directly to the negative line while the emitter is returned to the positive line by way of a resistor 112, passes current whenever the signal appearing at the emitter of transistor 104 to a peak and develops across a resistor 112 in its emitter least a potential representing the potential at the emitter of transistor 104 when the amount of light falling upon photodiode 103 is such as to represent the mid-point of a transition from a black to a white sector of disc 21. This voltage, which is stored by a capacitor 113 in shunt with resistor 112, is applied to the base of a transistor 114 which with another transistor 115 forms an emitter-coupled trigger circuit. The emitters of transformers 114, 115, are returned to the positive line through a common resistor 116, while their collectors are returned to the negative line through equal resistors 117, 118 respectively. This arrangement ensures that when the signal voltage applied to the base of transistor 115 from the emitter of transistor 104, to which it is directly connected, passes through the value corresponding to a midtransition point in the optical pulse generator, the transistor pair 114, 115 will pass from one state to the other, yielding at the collector of transistor 115 a signal containing very accurately timed transitions.

This signal is passed through a capacitor 119 to the base of a transistor 120, which is returned to the negative line by way of a resistor 121. The emitter of transistor 120 is taken directly to the positive line and its collector is returned to the negative line by way of a load resistance composed of resistors 122, 123 connected in series and is also taken to the positive line by way of a resistor 124. Signals appearing at the junction of load resistors 122, 123 are fed through a capacitor 125 to the base of a transistor 126, which is returned to the positive line by way of a resistor 127. The collector of transistor 126 is returned to the negative line by way of a resistor 128, signals appearing across which as a result of negative-going spikes appearing in the differentiated signal applied to the base of transistor 126 are fed out to counter drive amplifier 31 of FIGURE 1 by way of an output terminal 128.

Signals appearing at the collector of transistor 120 are fed through a capacitor 129 to the anode of a diode 130, which is held at a suitable potential by resistors 131, 132 through which the anode is returned respectively to the negative and positive lines. The time-constant of capacitor 129, with its associated resistors is chosen to have a differentiating effect upon the broad pulses in the applied signal but to have little effect upon the narrow pulses. The cathode of diode 130 is connected to the base of a transistor 133, which is returned to the negative line by way of a resistor 134 and is connected to the earthed positive line by way of a capacitor 135. Transistor 133 thus responds only to those transitions in the signal arising at the collector of transistor 120 which result from trailing-edge transitions of the broad pulses in the initial signal. The low amplitude signals arising from three out of the four bars of the pattern on disc 120 of FIGURE 1 are ignored, but that resulting from the fourth pattern bar yields a signal. This signal, of which the duration is controlled by the value of capacitor 135, is taken across the emitter resistor 136 of transistor 133 and fed directly to the base of a polarity inverting transistor 137, of which the base is returned to the positive line by way of a resistor 136A while its collector is returned to the negative line by way of a resistor 138 and to the positive line by way of a resistor 139. Signals appearing at the collector of transistor 136 once per revolution of the disc 120 are fed out to gate 33 of FIGURE 1 by way of an output terminal 140.

Component values suitable for use in the circuit arrangement described above in relation to FIGURE 4 are as follows:

Resistors:

| | |
|---|---|
| **106** | 47KΩ |
| **107** | 47KΩ |
| **108** | 3.3KΩ |
| **109** | 6.8KΩ |
| **111** | 100KΩ |
| **112** | 100KΩ |
| **116** | 4.7KΩ |
| **117** | 3.3KΩ |
| **118** | 3.3KΩ |
| **121** | 470KΩ |
| **122** | 1KΩ |
| **123** | 220Ω |
| **124** | 2.2KΩ |
| **127** | 3.3KΩ |
| **128** | 1KΩ |
| **131** | 2.7KΩ |
| **132** | 3.3KΩ |
| **134** | 100Ω |
| **136** | 3.3KΩ |
| **136A** | 100Ω |
| **138** | 1KΩ |
| **139** | 220Ω |

Capacitors:

| | | |
|---|---|---|
| **105** | µf | 2 |
| **113** | µf | 8 |
| **119** | µf | 8 |
| **125** | µf | 8 |
| **129** | µf | 0.047 |
| **135** | µf | 0.047 |

Diode (Mullard):

| | |
|---|---|
| **130** | OA73 |

Transistors (Mullard):

| | |
|---|---|
| **104** | OC202 |
| **110** | OC202 |
| **114** | GET882 |
| **115** | GET882 |
| **137** | GET882 |

FIGURE 5 shows a circuit arrangement suitable to perform the functions of ring counter 32 of FIGURE 1. This arrangement has been described in the specification of co-pending patent application No. 20,601/62, to which reference should be made for a full discussion of its mode of operation. Briefly, the operation of the circuit is such that positive-going drive pulses received from counter drive amplifier 31 of FIGURE 1 by way of an input terminal 151 are applied by way of individual capacitors to the bases of four transfer transistors 152, 153, 154 and 155. The circuit conditions are such that one only of transfer transistors 152–155 can respond to a drive pulse by becoming conductive and thus cause that one of four main transistors 156, 157, 158 and 159 which is then conductive to become cut off and at the same time to cause the next in sequence of main transistors 156–159 to become conductive. As explained in the co-pending patent application mentioned above, the action of the transfer transistors is not only to ensure the correct sequential operation of the quadri-stable circuit arrangement of main transistors, but to provide at four output terminals A, B, C and D, connected to the collectors of the individual main transistors, a sequence of potentials of which one is at all times different from the others and which appear in a sequence which is substantially without overlap or underlap, and is thus particularly suitable for controlling the operation of video gate circuits 10–13 of FIGURE 1.

The circuit arrangement described in the patent application mentioned above is modified for the purposes of the present invention by the addition of a reset transistor 160, which performs the function of gate 33 of FIGURE 1. This transistor has applied to its base pulses from output terminal B of the circuit described in relation to FIGURE 4, while its emitter is connected directly to the collector of transistors 155, 159 and its collector is connected by way of a resistor 161 to the base of main transistor 159, which controls the gate condition of video gate No. 1. If, when a pulse is received at terminal 162, transistor 159 is not conductive, then reset transistor 160 becomes conductive and forces transistor 159 to conduct, thus ensuring the correct phasing of the cycle of operations of ring counter 32 in relation to the position of head wheel 5.

While particular embodiments of the invention have been shown and described, it is apparent that changes and modifications may be made without departing from the invention in its broader aspects. The aim of the appended claims, therefore, is to cover all such changes and modifications as fall within the true spirit and scope of the invention.

I claim:

1. Magnetic record playback apparatus comprising in combination: a magnetic tape having a signal recorded thereon in a succession of individual record tracks; a rotatable member; a plurality of signal transducer heads spaced about the periphery of said member; drive means operable to drive said member at a predetermined speed of rotation; guide means presenting said tape for engagement with said member whereby said heads engage said record tracks in a cyclic sequence having a predetermined frequency; an output terminal; switching means operable to connect said heads to said output terminal in a cyclic sequence; signal generator means operating to develop a succession of switch drive signals repetitive at said head sequence frequency; means applying said switch drive signals to control said switching means whereby said cyclic switching sequence frequency is equal to said head sequence frequency; sequence control means responsive to the relative phasing of said head sequence and said switching sequence to develop a sequence control signal dependent upon the phase relation between said sequences; sequence control means operable to vary the relative phasing of said sequences; and means applying said sequence control signal to said sequence control means thereby to produce a predetermined phase relation between said sequences.

2. Magnetic record playback apparatus in accordance with claim 1, wherein said signal generator means includes the operative combination of a movable member arranged for movement in synchronism with said rotatable member and a fixed signal generating means cooperating with said movable member to yield said switch drive signals.

3. Magnetic tape record playback apparatus in accordance with claim 1 wherein said signal generator means includes the operative combination of a movable member arranged for movement in synchronism with said rotatable member and a fixed signal generating means cooperating with said movable member to yield said switch drive signals and said sequence control signal.

4. Magnetic record playback apparatus in accordance with claim 1 wherein said signal generator means includes, in combination: a patterned member mounted for rotation with said rotatable member, said member having a pattern of areas of different reflectance; a light source disposed to illuminate said pattern; photo-electrically sensitive means arranged to receive light reflected from said pattern whereby said photo-sensitive means yields an output voltage representative of said pattern, said pattern having a form such that said output voltage includes a signal component repetitive at said head sequence frequency; signal processor means operable to select a signal at said head sequence frequency from said output voltage; and means applying said output voltage to said signal processor means.

5. Magnetic record playback apparatus in accordance with claim 4 wherein said pattern has a form such that said output voltage includes a first signal component repetitive at said head sequence frequency and a second signal component repetitive at the frequency of rotation of said rotatable member and wherein said signal processor means is operable to select from said output voltage a first signal repetitive at said head sequence frequency and a second signal repetitive at said frequency or rotation.

6. Magnetic record playback apparatus in accordance with claim 1 wherein said switching means comprises, in combination: individual voltage controlled switch means each operating in response to an applied control voltage to permit the passage of signals from a respective one of said transducer heads to said output terminal; ring counter means assuming in response to a repetitive switch drive signal each in turn of a plurality of stable conditions equal in number to the number of said transducer heads, said ring counter means operating in each said stable condition to provide at an individual terminal a switch control voltage; means connecting each said switch means to receive a control voltage from a respective one of said terminals; and means applying said switch drive signal to drive said ring counter means.

7. Magnetic record playback apparatus in accordance with claim 6 wherein said sequence control means comprises signal generating means generating a sequence control signal repetitive once per revolution of said rotatable member; signal gating means; means including said signal gating means applying said sequence control signal to said ring counter to cause said counter to assume a successive stable state; said ring counter means operating in an individual one of said stable conditions to develop a gate control signal; and means applying said gate control signal to close said gate to the passage of said sequence control signals.

8. Magnetic record playback apparatus in accordance with claim 1, wherein said recorded signal is a television signal including a line synchronizing component and wherein said signal generator means comprises, in combination: a patterned member mounted for rotation with said rotatable member, said patterned member having thereon a pattern of areas of alternately different reflectance; a light source positioned to illuminate said pattern; an electrically light-sensitive device illuminated by said light reflected from said pattern, said pattern having a form such that said device yields an output voltage including a first signal component repetitive at said head sequence frequency and a second signal component repetitive at the frequency of rotation of said rotatable member; signal processor means operating to develop signals of differing frequency from a voltage containing signal components of said frequencies applied thereto; means applying said output voltage of said device to said signal processor means; bistable trigger means having first and second stable conditions, said bistable means operating in said second stable condition to produce a gating signal; means applying said head sequence frequency signal from said signal processor to said bistable trigger to induce said second stable condition; signal separator means operating to separate line synchronizing signals from a television signal applied thereto; circuit means applying said television signal from said output terminal to said separator means; drive pulse generator means operating in response to applied synchronizing signals to develop drive pulse signals predeterminedly timed in relation thereto; circuit means applying line synchronizing signals from said separator to said drive pulse generator; gated pulse generator means operating in response to a gating signal and to a drive signal to develop switch drive pulses and reset signals; means applying said drive signals from said drive pulse generator to said gated pulse generator; means applying said gating signal from said bistable trigger means to said gated pulse generator; means applying said switch drive pulses from said gated pulse generator to drive said switch means; and means applying said reset signal from said gated pulse generator to said bistable trigger means thereby to restore said trigger means to said first stable condition; whereby switching from one said head to the next in said sequence occurs at an instant predeterminedly timed in relation to a line synchronizing pulse in said television signal.

9. Magnetic tape record playback apparatus comprising, in combination: a magnetic tape having recorded therein in a succession of individual record tracks a television signal including line synchronizing pulses; a rotatable member; four signal transducer heads equally spaced about the periphery of said member; drive means for said member, said drive means being operable to rotate said member at a predetermined speed of rotation; guide means presenting said tape for engagement with said member whereby said heads traverse said signal track in a cyclic sequence having a predetermined frequency; and output terminal; four gating means each operable in response to an applied control voltage to allow signals to pass from a respective one of said transducer heads to said output terminal; ring counter means operable by an applied repetitive signal to assume each in turn of four stable conditions, said ring counter means operating in each said stable conditions to develop a control voltage at a respective output terminal; means connecting each said gating means to receive a control voltage from an individual said terminal of said ring counter means; signal generator means including patterned member mounted for rotation with said rotatable member, said patterned member having thereon a pattern of eight areas of alternately different reflectance; a light source positioned to illuminate said pattern; a photo-cell positioned to receive said light reflected from said pattern; said pattern including areas so dimensioned that said photocell yields an output voltage including a first signal component repetitive at said head sequence frequency and a second signal component repetitive at the frequency of rotation of said rotatable member; signal processing means operating to develop from an applied voltage containing signal components of different frequency respective signals at said frequency, means applying said photocell output voltage to said signal processor means whereby said processor means develops a first signal having said head sequence frequency and a second signal having said rotation frequency; bistable trigger means having first and second stable conditions, said bistable means operating in said second stable condition to produce a gating signal; means including an adjustable phase shifter applying said first signal from said signal processor to said bistable trigger to induce said second stable condition thereof; signal separator means operating to develop line synchronizing signals from an applied television signal; circuit means applying said television signal from said output terminal to said separator means; pulse generator means operating in response to applied synchronizing signals to generate drive pulses predeterminedly timed in relation thereto; circuit means applying line synchronizing pulses from said separator means to said pulse generator means; gated monostable trigger means operable by applied drive signals only in the presence of a gating signal to produce an output pulse of predetermined duration and a reset signal; means applying gating signals from said bistable trigger means to said gated monostable trigger; means applying drive pulses from said pulse generator means to said gated monostable trigger; means applying drive pulses from said output pulses from said monostable trigger to operate said ring counter means; means applying said reset signal from said monostable trigger to said bistable trigger means to induce said first stable condition thereof; gating means, means including said gating means applying said second signal from said signal processor to said ring counter to induce a change in the stable condition thereof; said ring counter means operating when in a predetermined one of said stable conditions to develop a gate-control signal; and circuit means applying said gate-control signal to said gating means.

References Cited

UNITED STATES PATENTS

| | | | |
|---|---|---|---|
| 2,968,692 | 1/1961 | Ginsburg | 178—6.6 |
| 2,979,557 | 4/1961 | Schroeder | 178—6.6 |

ROBERT L. GRIFFIN, *Primary Examiner.*

H. W. BRITTON, *Assistant Examiner.*